United States Patent
Lockyer et al.

(10) Patent No.: US 9,151,227 B2
(45) Date of Patent: Oct. 6, 2015

(54) END-FED LIQUID FUEL GALLERY FOR A GAS TURBINE FUEL INJECTOR

(75) Inventors: John Frederick Lockyer, San Diego, CA (US); Christopher Zdzislaw Twardochleb, Alpine, CA (US); Mario Eugene Abreu, Poway, CA (US)

(73) Assignee: Solar Turbines Incorporated, San Diego, CA (US)

( * ) Notice: Subject to any disclaimer, the term of this patent is extended or adjusted under 35 U.S.C. 154(b) by 996 days.

(21) Appl. No.: 12/943,064

(22) Filed: Nov. 10, 2010

(65) Prior Publication Data

US 2012/0111016 A1 May 10, 2012

(51) Int. Cl.
| | |
|---|---|
| *F23R 3/28* | (2006.01) |
| *F02C 7/22* | (2006.01) |
| *F02K 9/52* | (2006.01) |
| F02C 7/224 | (2006.01) |
| F23R 3/14 | (2006.01) |
| F23R 3/30 | (2006.01) |

(52) U.S. Cl.
CPC . *F02C 7/222* (2013.01); *F02K 9/52* (2013.01); *F23R 3/283* (2013.01); *F02C 7/224* (2013.01); *F23R 3/14* (2013.01); *F23R 3/30* (2013.01)

(58) Field of Classification Search
CPC ............ F23R 3/28; F23R 3/283; F23R 3/286; F23R 3/30; F23R 3/32; F23R 3/346; F23R 2900/03343; F23R 3/12; F23R 3/14; F02C 7/22; F02C 7/222; F02C 7/224; F23D 7/224; F23D 11/441; F23D 11/40
USPC ........... 60/736, 737, 738, 742, 746, 747, 748, 60/739, 740
See application file for complete search history.

(56) References Cited

U.S. PATENT DOCUMENTS

| | | | | |
|---|---|---|---|---|
| 2,172,383 A | * | 9/1939 | Honn | 239/132.1 |
| 2,611,244 A | * | 9/1952 | Clarke et al. | 60/736 |
| 2,781,637 A | * | 2/1957 | Dougherty | 60/736 |
| 4,865,542 A | * | 9/1989 | Hasenack et al. | 431/160 |
| 5,394,688 A | * | 3/1995 | Amos | 60/39.23 |
| 5,404,711 A | | 4/1995 | Rajput | |
| 5,521,824 A | | 5/1996 | Eagan et al. | |
| 5,590,529 A | * | 1/1997 | Joshi et al. | 60/737 |
| 5,613,363 A | * | 3/1997 | Joshi et al. | 60/737 |
| 5,836,163 A | | 11/1998 | Lockyer et al. | |

(Continued)

FOREIGN PATENT DOCUMENTS

| | | |
|---|---|---|
| CN | 101000136 | 7/2007 |
| CN | 101278152 | 10/2008 |
| GB | 2457807 A | 9/2009 |

*Primary Examiner* — Phutthiwat Wongwian
*Assistant Examiner* — Michael B Mantyla
(74) *Attorney, Agent, or Firm* — Finnegan, Henderson, Farabow, Garrett & Dunner, LLP

(57) ABSTRACT

A fuel injector for a gas turbine engine may include an injector housing extending along a longitudinal axis and configured to be fluidly coupled to a combustor of the turbine engine. The fuel injector may also include a flow path for a fuel air mixture to the combustor extending longitudinally within the injector housing, and a gallery for liquid fuel encircling the flow path. The gallery may include a plurality of fuel spokes that are configured to deliver liquid fuel from the gallery to the flow path. The gallery may extend from a feed end to a terminal end that overlaps the feed end. The feed end may be a region where liquid fuel enters the gallery and the terminal end may be a region where the gallery terminates.

9 Claims, 5 Drawing Sheets

(56) References Cited

U.S. PATENT DOCUMENTS

| | | |
|---|---|---|
| 6,240,732 B1 | 6/2001 | Allan |
| 6,321,541 B1 * | 11/2001 | Wrubel et al. ............... 60/740 |
| 7,028,483 B2 * | 4/2006 | Mansour et al. ............. 60/748 |
| 7,043,922 B2 | 5/2006 | Thompson et al. |
| 7,412,833 B2 * | 8/2008 | Widener ...................... 60/772 |
| 7,506,510 B2 * | 3/2009 | Thomson ..................... 60/740 |
| 7,891,193 B2 * | 2/2011 | Hernandez et al. ........... 60/742 |
| 7,926,178 B2 * | 4/2011 | Thomson et al. ....... 29/890.142 |
| 8,020,384 B2 * | 9/2011 | Pelletier et al. .............. 60/740 |
| 8,186,163 B2 * | 5/2012 | Hernandez et al. ........... 60/742 |
| 8,312,722 B2 * | 11/2012 | York et al. .................... 60/737 |
| 2007/0074517 A1 | 4/2007 | Rogers et al. |
| 2007/0157616 A1 | 7/2007 | Hernandez et al. |
| 2009/0038312 A1 | 2/2009 | Hernandez et al. |
| 2010/0115955 A1 | 5/2010 | Goeke et al. |
| 2010/0154424 A1 | 6/2010 | Twardochleb et al. |
| 2010/0293956 A1 * | 11/2010 | Nadkarni ...................... 60/748 |
| 2012/0186083 A1 * | 7/2012 | Hernandez et al. ....... 29/890.15 |

* cited by examiner

END-FED LIQUID FUEL GALLERY FOR A GAS TURBINE FUEL INJECTOR

TECHNICAL FIELD

The present disclosure relates generally to a fuel injector for a gas turbine engine, and more particularly, to a gas turbine fuel injector with an end-fed liquid fuel gallery.

BACKGROUND

Gas turbine engines produce power by extracting energy from a flow of hot gas produced by combustion of fuel in a stream of compressed air. In general, turbine engines have an upstream air compressor coupled to a downstream turbine with a combustion chamber ("combustor") in between. Energy is released when a mixture of compressed air and fuel is burned in the combustor. The resulting hot gases are directed over blades of the turbine to spin the turbine and produce mechanical power. In a typical turbine engine, one or more fuel injectors direct some type of liquid or gaseous hydrocarbon fuel (such, diesel fuel or natural gas) into the combustor for combustion. This fuel mixes with compressed air (from the air compressor) in the fuel injector, and flow to the combustor for combustion. The compressed air, which may exceed 800° F. (426.7° C.) in temperature, may surround sections of the fuel injector, and may create a hot ambient environment for the fuel injector. Combustion of the fuel in the combustor can create temperatures exceeding 2000° F. (1093.3° C.). These high temperatures in the vicinity of the fuel injector increase the temperature of the fuel injector during operation of the turbine engine.

In fuel injectors, fuel lines are used to direct the fuel to the fuel injector, and fuel galleries direct the fuel through nozzles that deliver the fuel to the combustor. The high temperatures of the fuel injector during operation may lead to coking of liquid fuel in these lines and galleries. Over time, this coke deposit in the lines and galleries can lead to flow restrictions that adversely affect the operation of the gas turbine engine.

U.S. patent application publication US 2007/0157616 A1 to Hernandez et al. (the '616 publication) describes a fuel injector for a jet engine. The fuel injector of the '616 publication includes a primary fuel circuit and a secondary fuel circuit that direct separate streams of fuel through the fuel injector. The secondary circuit includes an annular distribution chamber positioned in an air swirler and fluidly coupled to a plurality of orifices. The primary circuit includes a separate distribution chamber that is positioned adjacent the distribution chamber of the secondary circuit. In the fuel injector of the '616 publication, fuel in the distribution chamber of one fuel circuit is used to cool the fuel in the distribution chamber of the other fuel circuit. The fuel injector of the '616 publication may be suitable for applications that include multiple fuel circuits positioned proximate each other. However, in applications where such a layout is not feasible due to space or other constraints, the fuel injector of the '616 publication may not be suitable. For instance, positioning multiple distribution chambers adjacent to each other in a single air swirler may introduce design complexities when space is limited.

SUMMARY

In one aspect, a fuel injector for a gas turbine engine is disclosed. The fuel injector includes an injector housing extending along a longitudinal axis and configured to be fluidly coupled to a combustor of the turbine engine. The fuel injector may also include a flow path for a fuel air mixture to the combustor extending longitudinally within the injector housing, and a gallery for liquid fuel encircling the flow path. The gallery may include a plurality of fuel spokes that are configured to deliver liquid fuel from the gallery to the flow path. The gallery may extend from a feed end to a terminal end that overlaps the feed end. The feed end may be a region where liquid fuel enters the gallery and the terminal end may be a region where the gallery terminates.

In another aspect, a method of operating a gas turbine engine is disclosed. The method includes directing compressed air through a longitudinally extending flow path of a fuel injector and directing liquid fuel through a gallery that encircles the flow path and extends from a feed end to a terminal end that overlaps the feed end. The feed end may be a region where liquid fuel enters the gallery and the terminal end may be a region where the gallery terminates. The method may also include combusting a mixture of the liquid fuel and air in a combustor of the gas turbine engine, and cooling walls of the gallery using the liquid fuel flowing through the gallery such that a temperature of a wall at a downstream portion of the terminal end is lower than a temperature of a wall at an upstream portion of the terminal end.

In yet another aspect, a gas turbine engine is disclosed. The gas turbine engine includes a compressor and a combustor positioned downstream of the compressor. The gas turbine engine also includes a fuel injector fluidly coupling the compressor and the combustor. The fuel injector may be configured to direct a fuel air mixture to the combustor through a flow path that extends longitudinally therethrough. The fuel injector may include a gallery for liquid fuel encircling the flow path. The gallery may extend from a feed end to a terminal end that overlaps, and is positioned radially inwards of, the feed end. The feed end may be a region where liquid fuel enters the gallery and the terminal end may be a region where the gallery terminates.

DETAILED DESCRIPTION

Figure 1:
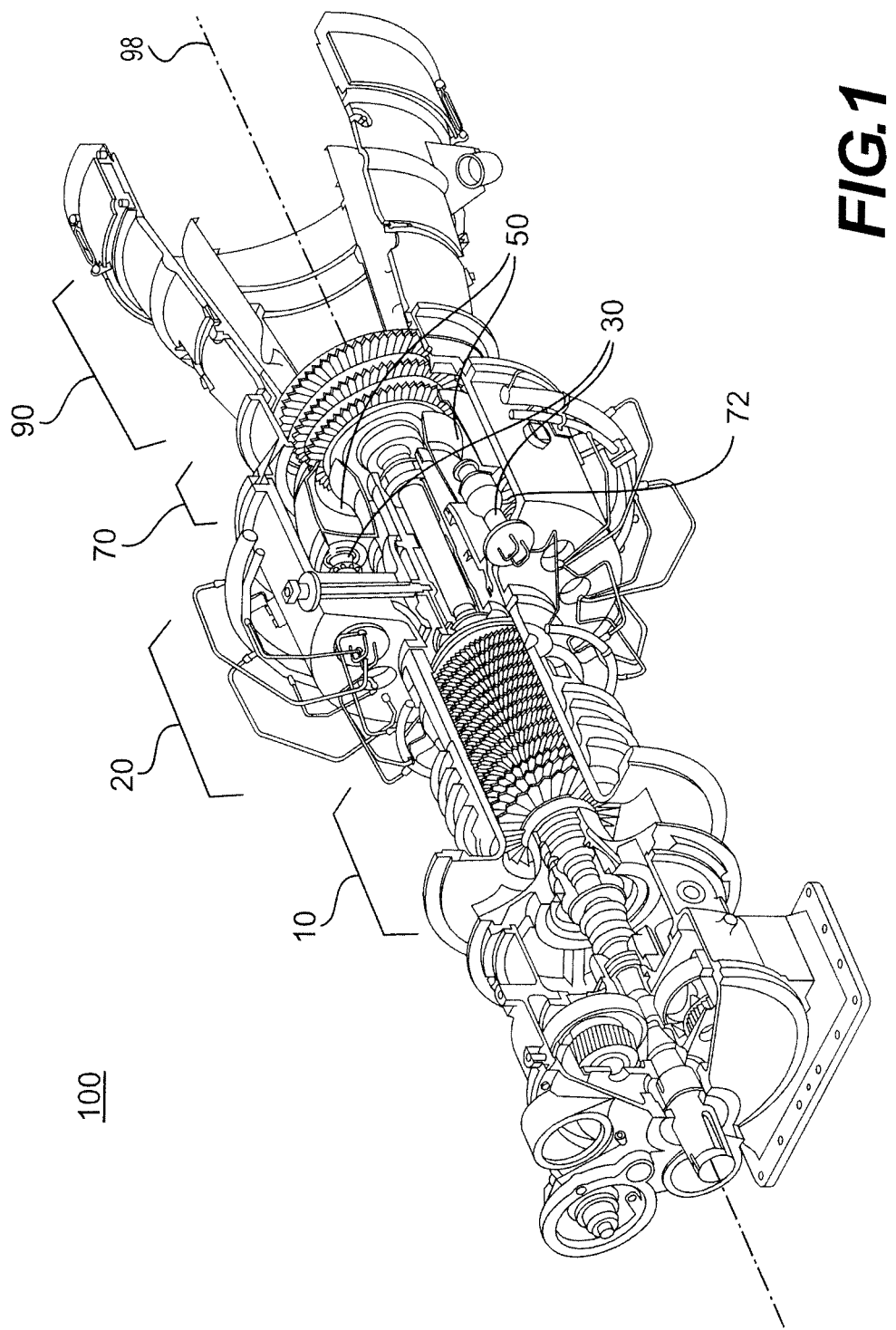
FIG. 1 is an illustration of an exemplary disclosed gas turbine engine system.

FIG. 1 illustrates an exemplary gas turbine engine (GTE) 100. GTE 100 may have, among other systems, a compressor system 10, a combustor system 20, a turbine system 70, and an exhaust system 90 arranged along an engine axis 98. Compressor system 10 compresses air to a compressor discharge pressure and temperature (approximately 200 psi and 800° F. (426.7° C.) respectively) and delivers the compressed air to an enclosure 72 of combustor system 20. The compressed air is then directed from enclosure 72 into one or more fuel injectors 30 positioned therein. The compressed air may be mixed with a fuel in fuel injector 30, and the mixture is directed to a combustor 50. The fuel-air mixture ignites and burns in combustor 50 to produce combustion gases at high pressures and temperatures of at least 2000° F. (1093.3° C.). These combustion gases are then directed to turbine system 70. Turbine system 70 extracts energy from these combustion gases, and directs the exhaust gases to the atmosphere through exhaust system 90. The layout of GTE 100 illustrated in FIG. 1, and described above, is only exemplary and fuel injectors 30 of the current disclosure may be used with any configuration and layout of GTE 100.

Figure 2:
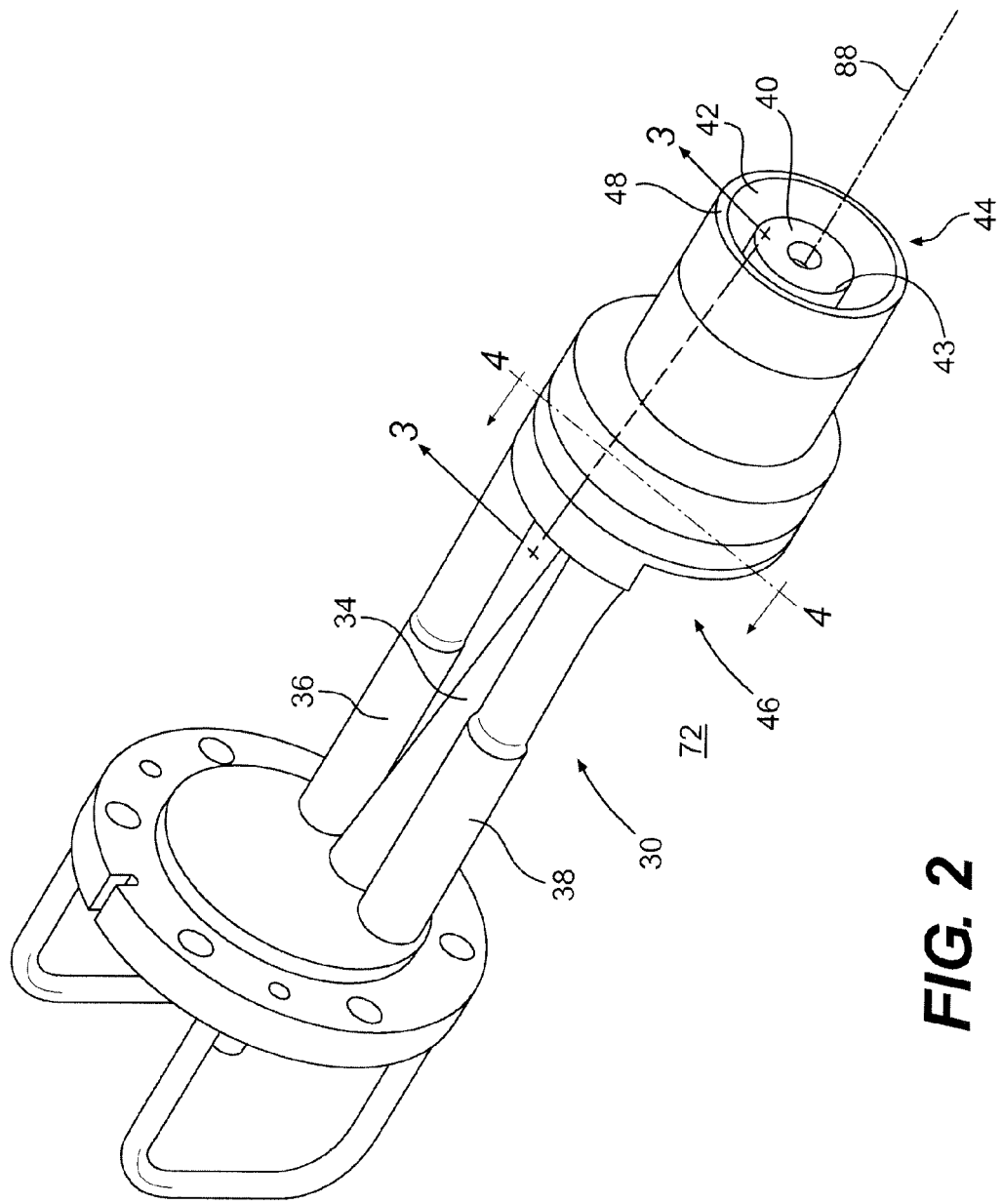
FIG. 2 is an illustration of an exemplary fuel injector used in the turbine engine of FIG. 1.

FIG. 2 is an illustration of an embodiment of a fuel injector 30 that may be coupled to combustor 50 of GTE 100. Fuel injector 30 extends from a first end 44, that is fluidly coupled to combustor 50, to a second end 46 that is positioned in enclosure 72. Compressed air, that is stored in enclosure 72, enters fuel injector 30 through openings (not visible in FIG. 2) on second end 46. Liquid fuel is also directed into fuel injector 30 at the second end 46 through a liquid fuel line 38 (and pilot fuel supply line 34). This fuel gets mixed with compressed air flowing through fuel injector 30 and the fuel-air mixture enters combustor 50 through first end 44. Some embodiments of fuel injector 30 (such as the embodiment of fuel injector 30 illustrated in FIG. 2) may be a dual fuel injector that is configured to selectively deliver a gaseous fuel or a liquid fuel to combustor 50. In such a dual fuel injector, the fuel delivered to fuel injector 30 may be switched between a gaseous and a liquid fuel to suit the operating conditions of GTE 100. For instance, at an operating site with an abundant supply of natural gas, fuel injector 30 may deliver liquid fuel to combustor 50 during start up and later switch to natural gas fuel to utilize the locally available fuel supply. In a dual fuel injector, in addition to the fuel lines that deliver liquid fuel, some fuel lines may also convey gaseous fuel to the fuel injector. For instance, in fuel injector 30 of FIG. 2, gas fuel line 36 (and pilot fuel supply line 34) may direct gaseous fuel to fuel injector 30.

To reduce the emission of atmospheric pollutants (such as $NO_x$) while maintaining a stable flame in combustor 50, fuel injector 30 directs separate streams of fuel-air mixture to combustor 50. These separate streams include a main fuel stream and a pilot fuel stream. Main fuel stream is a fuel-air mixture stream that is lean in fuel, and the pilot fuel stream is a fuel-air mixture stream that is richer in fuel. The lean fuel-air mixture, which forms the main fuel stream, burns in combustor 50 to produce a low temperature flame. While the $NO_x$ emissions of GTE 100 operating with a low temperature flame may be relatively low, the low temperature flame under certain circumstances can be unstable. The pilot fuel stream, which is made of a richer fuel air mixture, burns at a higher temperature and serves to stabilize the combustion process at the cost of slightly increased $NO_x$ emissions. To minimize $NO_x$ emissions while maintaining the stability of the combustion process, a control system (not shown) of GTE 100 activates and controls the flow of pilot fuel-air mixture when an unstable combustion event is detected.

The pilot fuel-air mixture is directed to combustor 50 through a pilot assembly 40 centrally located in fuel injector 30. The pilot fuel supply line 34 supplies liquid and gaseous fuel to the pilot assembly 40. Fuel injector 30 also includes a tubular premix barrel 48 circumferentially disposed about a housing 43 of pilot assembly 40 to define an annular duct 42 around pilot assembly 40. The main fuel-air mixture is directed to combustor 50 through this annular duct 42. The liquid fuel (and gaseous fuel in the case of dual fuel injectors) and compressed air are directed to both pilot assembly 40 and annular duct 42 to form the pilot fuel-air mixture and the main fuel-air mixture, respectively. These fuel-air mixtures forms separate fuel air streams that are directed into combustor 50 through first end 44 of fuel injector 30.

Figure 3:
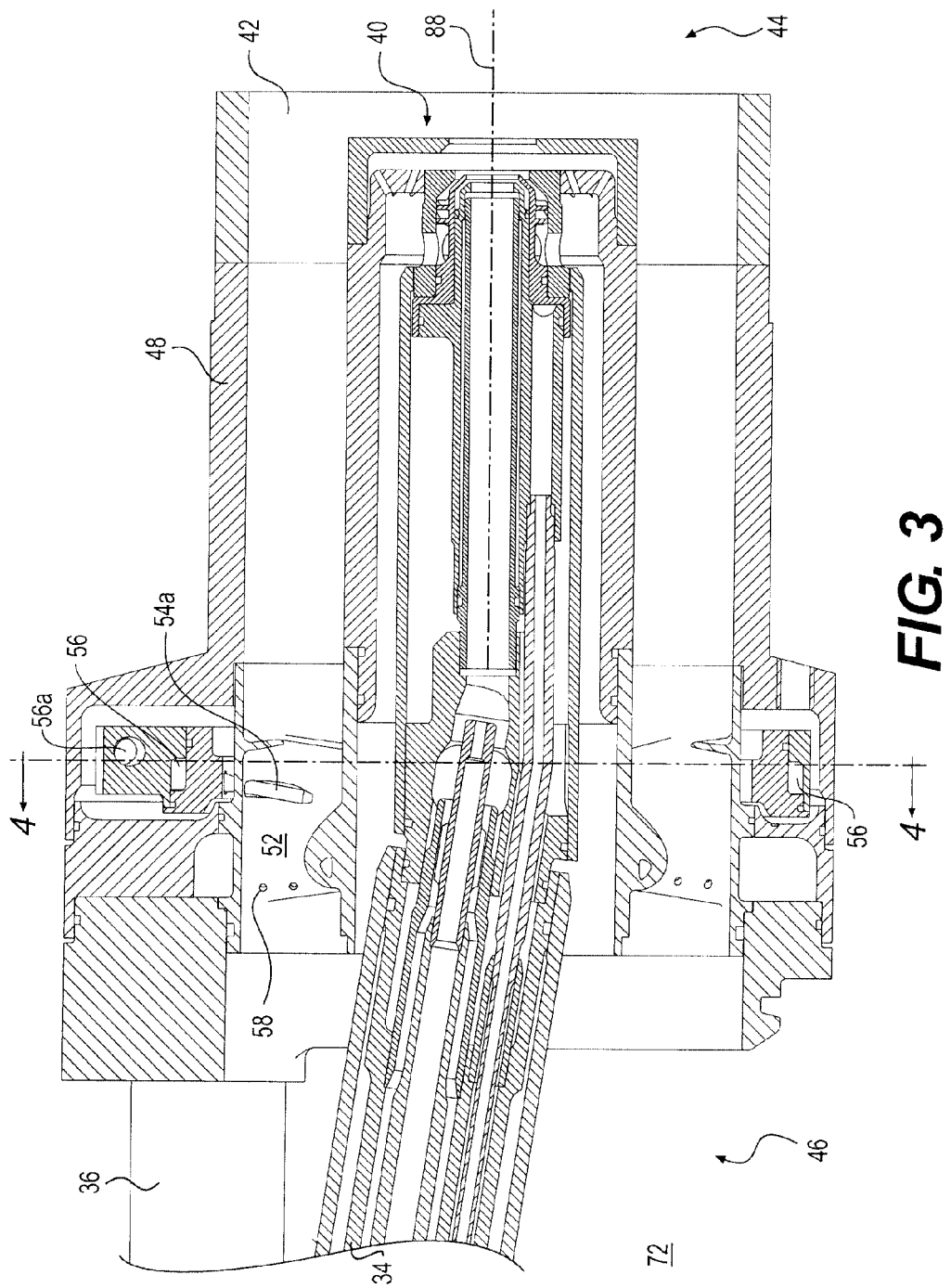
FIG. 3 is a cross-sectional view of the fuel injector of FIG. 2 along a longitudinal plane.
Figure 4:
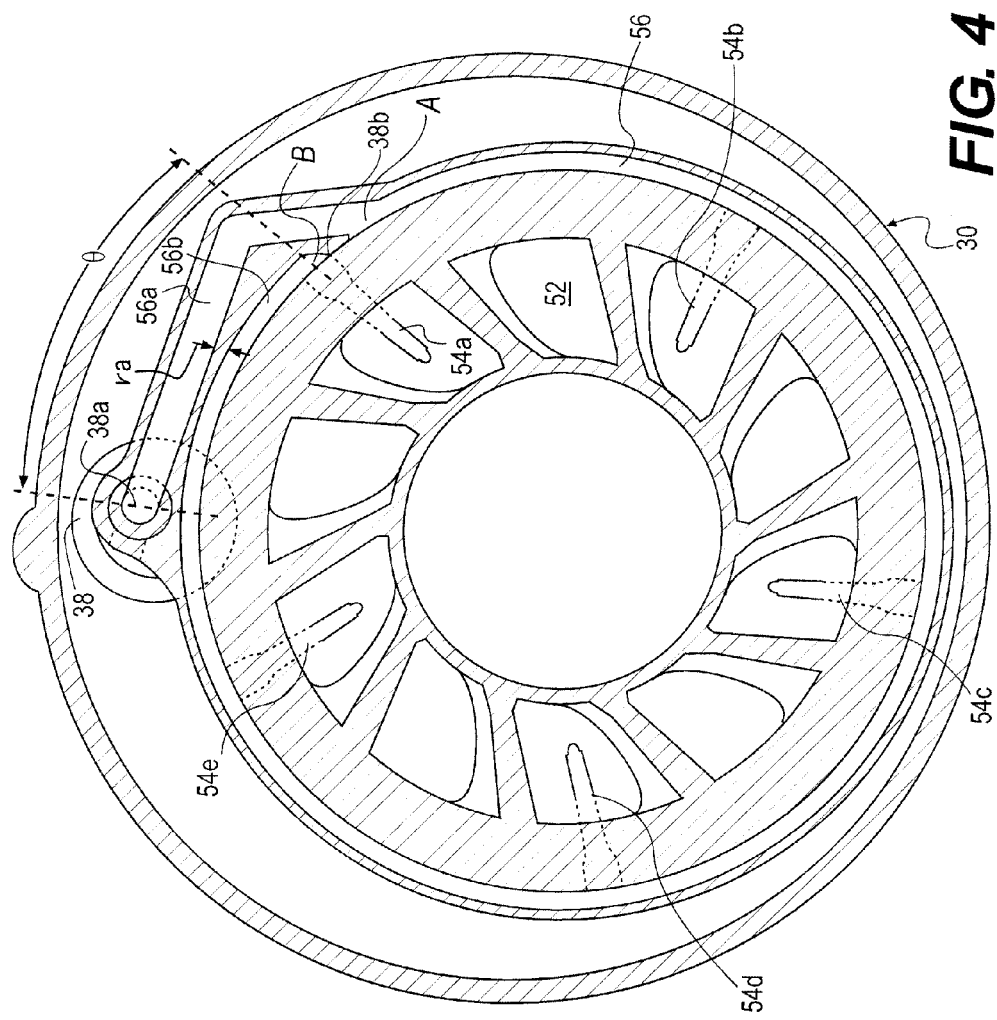
FIG. 4 is a cross-sectional view of the fuel injector of FIG. 2 along a transverse plane.

FIG. 3 is a cross-sectional illustration of fuel injector 30 along plane 3-3 of FIG. 2. Pilot assembly 40 includes multiple components that cooperate together to deliver the pilot fuel-air mixture to combustor 50. Since the operation of fuel injectors and pilot assemblies are known in the art, details of the pilot assembly 40 are omitted for the sake of brevity. Proximate second end 46, annular duct 42 includes an air swirler 52 that is configured to impart a swirl to the compressed air entering annular duct 42 from enclosure 72. Fuel from liquid fuel line 38 (see FIG. 2) is directed to a liquid fuel gallery 56 that is circumferentially disposed around air swirler 52. A plurality of spokes 54a-54e (only one spoke 54a is visible in FIG. 3, spokes 54a-54e are illustrated in FIG. 4) deliver the liquid fuel in liquid fuel gallery 56 to the compressed air flowing past air swirler 52. This fuel mixes with the swirled air stream to form the main fuel stream that enters combustor 50 through annular duct 42. Although FIG. 3 illustrates spoke 54a as being coupled to air swirler 52, this is not a requirement, and in some embodiments, the spokes 54a-54e may be positioned upstream or downstream of air swirler 52. In dual fuel injectors, air swirler 52 also includes a plurality of gas orifices 58 configured to inject gaseous fuel into the swirled air stream. Depending upon the type of fuel the fuel injector is operating on, one of liquid fuel or gaseous fuel is delivered to the compressed air flowing past air swirler 52. This fuel (liquid or gaseous) will mix with the compressed air to form the main fuel stream.

FIG. 4 is a cross-sectional illustration of fuel injector 30 along plane 4-4 of FIG. 2. For the sake of clarity, the pilot assembly has been removed from the fuel injector in the illustration of FIG. 4. Liquid fuel from liquid fuel line 38 is directed into the liquid fuel gallery 56 at inlet 38a. The liquid fuel gallery 56 wraps around the fuel injector 30 to extend from inlet 38a to a tip 38b. The section of liquid fuel gallery 56 proximate the inlet 38a is called the feed end 56a, and the section proximate the tip 38b is called the terminal end 56b of the liquid fuel gallery 56. The liquid fuel gallery is positioned such that the tip 38b extends past the inlet 38a. In this configuration, the terminal end 56b of the liquid fuel gallery 56 overlaps the feed end 56a. The amount of overlap θ may depend upon the application. In some embodiments, overlap θ may be zero while in others overlap θ may be greater than zero. In some embodiments, the amount of overlap θ may be between about 30° and 40°, while in other embodiments, the amount of overlap may be between about 35° and 38°. When the overlap θ is greater than zero, the feed end 56a may be radially spaced apart from the terminal end 56b (as depicted in FIG. 4). Although, in general, the radial gap $r_a$ between the feed end 56a and the terminal end 56b can be any value, in some embodiments, this radial gap $r_a$ may vary between about 0.01 inches (0.25 mm) and about 0.5 inches (12.7 mm), while in other embodiments, the radial gap $r_a$ may be between about 0.05 inches (1.27 mm) to about 0.25 inches (6.35 mm). In some embodiments, the feed end 56a may be substantially parallel to the terminal end 56b, and the radial gap $r_a$ may be a fixed value. In other embodiments, as in the embodiment of FIG. 4, the feed end 56a may include substantially straight segments while the terminal end 56b may be curved. In such embodiments, the radial gap $r_a$ may be variable. Although in FIG. 4, feed end 56a is shown to include two straight segments positioned like a bend elbow, this is only exemplary. In general, the feed end 56a may have any shape and may be oriented in any manner with respect to the terminal end 56b. In addition to being radially spaced apart, in some embodiments, the terminal end 56b may also be longitudinally spaced apart from feed end 56a (compare the longitudinal position of feed end 56a with that of the liquid fuel gallery 56 in FIG. 3). In some embodiments, the liquid fuel gallery 56 may wrap around the fuel injector 30 multiple times and each turn may be radially and longitudinally displaced from another such that the liquid fuel gallery 56 forms a helical path around air swirler 42.

Spokes 54a-54e fluidly couple the liquid fuel gallery 56 to annular duct 42. These spokes 54a-54e extend into annular space 42 through the vanes of air swirler 52 and are adapted to spray the liquid fuel from liquid fuel gallery 56 into the compressed air flowing past the air swirler 52. In the embodiment of FIG. 4, these spokes 54a-54e are symmetrically positioned around fuel injector 30. Although five spokes (54a-54e) are illustrated in the embodiment of FIG. 4, in general, any number of spokes may be arranged in any manner (symmetrically or otherwise) in different embodiments of fuel injectors. As each spoke discharges a quantity of fuel from liquid fuel gallery 56 into fuel injector 30, the mass flow rate of fuel flowing in the liquid fuel gallery 56 towards the next spoke decreases. For instance, after spoke 54b discharges fuel, the mass flow rate of fuel flowing in liquid fuel gallery 56 towards spoke 54c decreases. And, after spoke 54c discharges fuel, the mass flow rate of fuel flowing in liquid fuel gallery towards spoke 54d decreases further. In embodiments where the cross-sectional area of the liquid fuel gallery 56 remains substantially a constant as it wraps around the fuel injector 30 (as illustrated in the embodiment of FIG. 4), a reduced mass flow rate translates into a reduction in the velocity of fuel flowing within the liquid fuel gallery 56. Therefore, the mass flow rate (and hence the velocity) of the fuel in the liquid fuel gallery 56 gets progressively lower as the fuel flows from the feed end 56a to the terminal end 56b of the liquid fuel gallery 56. Consequently, the mass flow rate and the velocity of the liquid fuel at the terminal end 56b of the liquid fuel gallery 56 is the lowest.

As described earlier, during operation of GTE 100, the temperatures in the vicinity of fuel injector 30 are high. In order to ensure that these high temperatures do not cause coking of liquid fuel, it is desirable to maintain the walls of the liquid fuel gallery below a desired temperature (of, for example, about 400° F. (204.4° C.)). As liquid fuel flows though liquid fuel gallery 56, the flowing fuel cools the walls of the liquid fuel gallery 56 in its vicinity. In some cases, the reduced velocity and mass flow rate of liquid fuel at the terminal end 56b of liquid fuel gallery 56 may not provide sufficient cooling to keep the walls of the gallery in this region below the desired temperature. However, orienting the liquid fuel gallery 56 such that the terminal end 56b overlaps the feed end 56a (where the flow rate of fuel is high enough to provide sufficient cooling) allows the walls of the terminal end to be cooled by the fuel flowing through the feed end 56a of the liquid fuel gallery 56. Overlapping the terminal end 56b of the liquid fuel gallery 56 with the feed end 56a in this manner, allows heat from the walls of the terminal end 56b to be transferred by conduction to the walls of the feed end 56a and then removed by convection by the relatively high velocity liquid fuel flowing therethrough. The amount of overlap provided may depend upon the length of the terminal end 56b that is desired to be cooled and other operational details of GTE 100 (such as, for example, characteristics of fuel flow through liquid fuel gallery, etc.).

INDUSTRIAL APPLICABILITY

The disclosed gas turbine fuel injector may be applicable to any turbine engine where it is desirable to maintain a temperature of selected regions of the fuel injector below a desired temperature. In an embodiment of a fuel injector that is configured to operate on liquid fuel, the liquid fuel gallery is fed through a feed end, and the liquid fuel gallery is designed such that the terminal end overlaps the feed end. In such a layout, the gallery wall at the terminal end is cooled by the liquid fuel flowing through the feed end. The operation of a gas turbine engine with a fuel injector having an end-fed liquid gallery will now be described.

Figure 5:
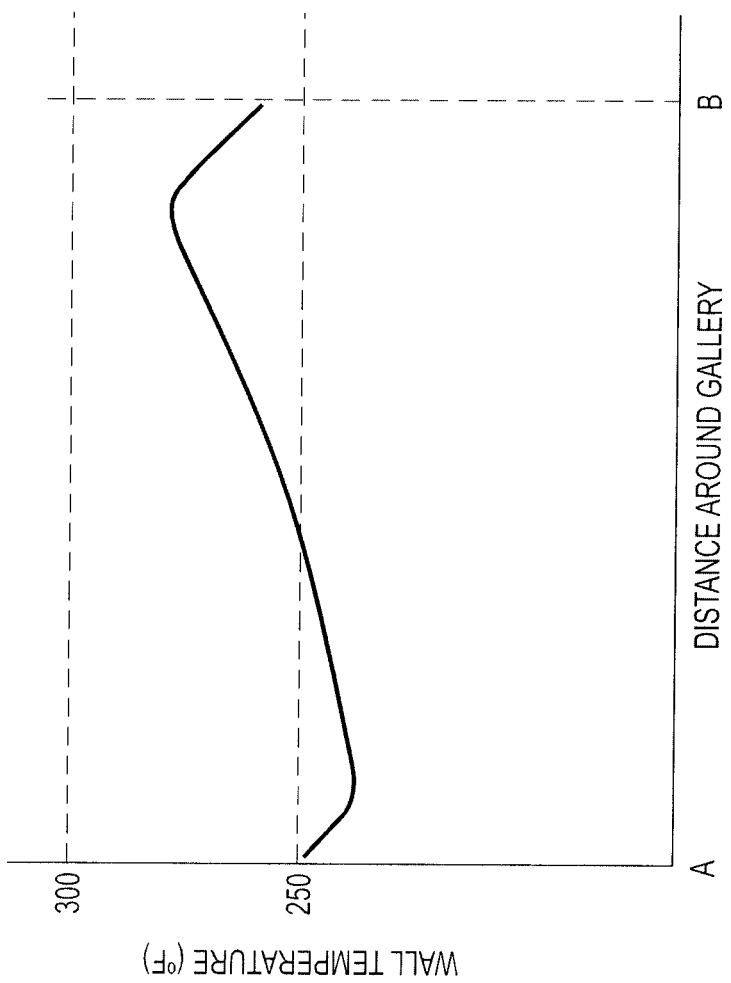
FIG. 5 is the temperature profile around a liquid fuel gallery of the fuel injector of FIG. 2.

During operation of GTE 100, fuel injectors 30 are exposed to high temperatures. In order to reduce the chance that these high temperatures result in coking of liquid fuel, it is desirable to maintain the walls of the liquid fuel gallery 56 of the fuel injector 30 below a safe operating temperature, such as, for example, 400° F. (204.4° C.). The liquid fuel flowing through the liquid fuel gallery removes heat by convection and helps to maintain these walls below 400° F. (204.4° C.). However, since the mass flow rate and the velocity of the fuel flowing through the gallery is low at its terminal end, the cooling provided by the flowing fuel at the terminal end may not be sufficient to keep the walls at the terminal end below 400° F. (204.4° C.). Designing the fuel gallery such that the terminal end overlaps the feed end allows the walls of the terminal end to be cooled by fuel flowing through the feed end. In order to determine the effect of such a liquid fuel gallery layout on the temperature of the gallery walls, numerical simulations of the operation of a gas turbine engine were conducted. FIG. 5 is an illustration of the obtained temperature profile of the walls of an exemplary fuel injector 30 having liquid fuel gallery 56 as illustrated in FIG. 4. As the fuel enters the liquid fuel gallery 56 from the feed end 56a, the flowing fuel cools the walls of the gallery. This is evident from the decreasing wall temperature in the initial section of the liquid fuel gallery 56. As the fuel continues to flow around the gallery, its mass flow rate and velocity decreases as the fuel is discharged by each of the orifices. This decreasing mass flow rate and velocity reduces the amount of heat removed by the flowing fuel. This is evident from the increasing wall temperature in the middle section of FIG. 5. As the fuel enters the terminal end 56b, although the mass flow rate and velocity of the fuel in this region is low, the wall temperature decreases. This decrease in wall temperature results from the additional cooling provided by fuel flowing through the overlapping feed end. In the absence of this additional cooling, the wall temperature of the liquid fuel gallery 56 at the terminal end 56b would have continued to increase. Feeding the liquid fuel gallery through the feed end and wrapping the gallery around the fuel injector such that terminal end overlaps the feed end allows the temperature of the gallery walls to be maintained below the desired temperature of 400° F. (204.4° C.).

It will be apparent to those skilled in the art that various modifications and variations can be made to the disclosed gas turbine fuel injector with an end-fed liquid gallery. Other embodiments will be apparent to those skilled in the art from consideration of the specification and practice of the disclosed gas turbine fuel injector with an end-fed liquid gallery. It is intended that the specification and examples be considered as exemplary only, with a true scope being indicated by the following claims and their equivalents.

What is claimed is:

1. A fuel injector for a gas turbine engine comprising:
an injector housing extending along a longitudinal axis and configured to be fluidly coupled to a combustor of the gas turbine engine;
a flow path for a fuel air mixture to the combustor extending longitudinally within the injector housing; and
a gallery for liquid fuel encircling the flow path, the gallery including a plurality of fuel spokes that are configured to deliver liquid fuel from the gallery to the flow path, the gallery extending circumferentially around the flow path from a feed end to a terminal end that radially overlaps the feed end, the feed end being a region where liquid fuel enters the gallery and the terminal end being a region where the gallery terminates, the gallery wrapping around the flow path multiple times with each turn being radially and longitudinally displaced from another such that the gallery forms a helical path around the flow path; and wherein the plurality of fuel spokes are sequentially positioned along a length of the gallery and positioned symmetrically around the gallery and extending through a wall of a swirler and between vanes of the swirler, wherein a cross-sectional area of the gallery is substantially constant such that a velocity of the liquid fuel flowing in the gallery decreases from the feed end to the terminal end.

2. The fuel injector of claim 1, wherein a fuel spoke of the plurality of fuel spokes is positioned at the terminal end of the gallery.

3. The fuel injector or claim 1, wherein the terminal end is positioned radially inwards of, and longitudinally displaced from, the feed end of the gallery.

4. The fuel injector or claim 1, wherein the terminal end is positioned radially inwards of the feed end, and the overlap of the feed end and the terminal end is between about 35° and 38°.

5. The fuel injector of claim 1, wherein a radial spacing between the feed end and the terminal end is between about 0.01 inches (0.25 mm) and about 0.5 inches (12.7 mm).

6. The fuel injector of claim 1, wherein the feed end includes substantially straight lengths and the terminal end is curved.

7. A gas turbine engine, comprising:
a compressor;
a combustor positioned downstream of the compressor; and
a fuel injector fluidly coupling the compressor and the combustor, the fuel injector being configured to direct a fuel air mixture to the combustor through a flow path that extends longitudinally therethrough, the fuel injector including a gallery for liquid fuel encircling the flow path, the gallery including a plurality of fuel spokes that are configured to deliver liquid fuel from the gallery to the flow path, the gallery extending circumferentially from a feed end to a terminal end that overlaps, and is positioned radially inwards of, the feed end, wherein the feed end is a region where liquid fuel enters the gallery and the terminal end is a region where the gallery terminates, the gallery wrapping around the flow path multiple times with each turn being radially and longitudinally displaced from another such that the gallery forms a helical path around the flow path, and the plurality of fuel spokes are sequentially positioned along a length of the gallery and positioned symmetrically around the gallery and extending through a wall of a swirler and between vanes of the swirler, wherein a cross-sectional area of the gallery is substantially constant such that a velocity of the liquid fuel flowing in the gallery decreases from the feed end to the terminal end.

8. The gas turbine engine of claim 7, wherein the terminal end overlaps the feed end by angle between about 35° and 38°.

9. The gas turbine engine of claim 7, wherein a radial spacing between the feed end and the terminal end is between about 0.01 inches (0.25 mm) and about 0.5 inches (12.7 mm).

* * * * *